United States Patent
Kobayashi et al.

[11] Patent Number: 5,771,412
[45] Date of Patent: Jun. 23, 1998

[54] FOCUS DETECTION DEVICE AND METHOD USING A PROJECTION PATTERN MATERIAL

[75] Inventors: Hirokazu Kobayashi, Tokyo; Yosuke Kusaka, Kanagawa-ken, both of Japan

[73] Assignee: Nikon Corporation, Tokyo, Japan

[21] Appl. No.: 601,847

[22] Filed: Feb. 15, 1996

[30] Foreign Application Priority Data

Feb. 15, 1995 [JP] Japan ................................ 7-027161
Apr. 7, 1995 [JP] Japan ................................ 7-082714

[51] Int. Cl.[6] ............................................ G03B 3/00
[52] U.S. Cl. ................................ 396/106; 396/110
[58] Field of Search ................................ 396/106–110

[56] References Cited

U.S. PATENT DOCUMENTS

| | | | |
|---|---|---|---|
| 4,255,029 | 3/1981 | Freudenschuss | 354/25 |
| 4,575,211 | 3/1986 | Matsumura et al. | 354/403 |
| 4,690,538 | 9/1987 | Matsui et al. | 354/403 |
| 4,803,508 | 2/1989 | Matsui et al. | 354/403 |
| 4,827,301 | 5/1989 | Matsui et al. | |
| 4,926,206 | 5/1990 | Matsui et al. | 354/403 |
| 4,969,004 | 11/1990 | Matsui et al. | 354/403 |
| 5,459,551 | 10/1995 | Suzuki et al. | 354/403 |
| 5,572,368 | 11/1996 | Yokota et al. | 359/710 |

FOREIGN PATENT DOCUMENTS 61-138222  6/1986  Japan.

*Primary Examiner*—Safet Metjahic
*Assistant Examiner*—Michael Dalakis
*Attorney, Agent, or Firm*—Oliff & Berridge, PLC

[57] ABSTRACT

A device and a method for focus detection that increases the amount of light projected on an object to capture the object without fail. Light rays are projected onto an object by a projection optical system using a projection pattern film that contains transparent and non-transparent parts, or semi-transparent parts with different light transmission rates. A pair of light rays from the object pass through the shooting lens and are guided onto a photo-electric converter by a focus detection optical system to compose a pair of object images. The focus adjustment state of the shooting lens is detected based on the image defocus amount of the pair of the object images.

35 Claims, 8 Drawing Sheets

FOCUS DETECTION DEVICE AND METHOD USING A PROJECTION PATTERN MATERIAL

BACKGROUND OF THE INVENTION

1. Field of the Invention

The present invention relates to an active focus detection device that performs focus detection by projecting light rays on an object with a projection optical system.

2. Description of Related Art

In general, passive focus detection devices are used in lens interchangeable cameras. With passive devices, focus detection is performed by using external light rays passing through a shooting lens in order to cope with various interchangeable lenses.

However, with such passive focus detection devices, focus detection becomes difficult, or even impossible if the background is dark or if the object has low contrast. In order to resolve the problems of the passive focus detection device, an active focus detection device was developed that performs focus detection by projecting auxiliary light rays from a specified illumination device (for example, see Japanese Laid-Open Patent Publication Sho 61-138222.)

FIG. 10 is a horizontal cross section of a camera including an active focus detection device. With this camera, after passing through a light transmitting unit of the main mirror 702, the light rays passing through a shooting lens 701 are reflected downwards by a sub-mirror 703 and enter focus detection unit 704. A flash device 707 is mounted on an accessory shoe 706 provided on the top surface of a camera 705. A projection optical system 711 comprising a projection light source 708, projection pattern material 709, and a projection lens 710 is placed inside the flash device 707.

When the background is dark or when an object has low contrast, infrared rays, for example, are emitted from the projection light source 708. The rays pass through the projection pattern material 709 and the projection lens 710 and project the projection pattern image of the projection pattern film 709 on the object. The reflected light rays enter a focus detection unit 704 that incorporates a known phase differential method. For example, the light passes through the shooting lens 701 and the mirrors 702 and 703 and subsequently the focus adjustment state of the shooting lens 701 is detected.

FIG. 11 shows focus detection based on a phase differential method. In the figure, a predetermined focus surface 801 of the shooting lens 701 is equivalent to the film plane. A surface 802 is conjugal to the predetermined image surface 801 relative to the focus detection optical system. The focus detection optical system includes a condenser lens 803 and a pair of re-imaging lenses 804 and 805.

A front focus image A, focus image B, and a rear focus image C formed on the predetermined image surface 801 by the shooting lens 701 are re-composed on the predetermined image surface 802 by the condenser lens 803 and the pair of re-imaging lenses, 804 and 805, as the images A1, B1, and C1 respectively. The interval between the first and the second images varies depending on the focus adjustment state of the shooting lens 701.

Therefore, by placing a photo-electric converter 806 such as a charge-coupled device (CCD), in the vicinity of the predetermined image surface 802, the length of the interval between two images when they best coincide with each other is obtained based on the output from the photo-electric converter 806. The focus adjustment state of the shooting lens 701 is determined from the interval obtained.

In FIG. 11, shooting lens 701 is oriented on optical axis 807. A diaphragm mask 808 forms a pair of aperture stops immediately before re-imaging lenses 804 and 805.

FIG. 12 shows projection pattern material 709 of a conventional focus detection device. In a conventional projection pattern, the width of the non-transparent parts 601, the width of the transparent parts 602, and the repeating period (p+q) of the two are formed completely irregularly.

This formation is provided because when a plurality of non-transparent parts 601 with the same width are provided in a focus detection device incorporating the phase differential method, a plurality of sets in which two projection patterns formed by re-imaging lenses 804 and 805 coincide with each other is detected, causing the occurrence of a focus detection error.

However, in conventional focus detection devices, the widths of the non-transparent parts and the transparent parts of the projection pattern film differ from each other and the repeating period is also formed completely irregularly. Hence, several problems occur.

When an irregular and single or a plurality of projection pattern images of non-transparent and transparent parts are formed on the photo-electric converter such as a CCD, the non-transparent portion may become larger or smaller, causing the part illuminated within the CCD to be larger or smaller. This may cause the outputs from portions of the CCD detector to differ, which may result in the occurrence of focus detection error.

Moreover, production of projection pattern film becomes difficult when the widths of the non-transparent parts and the widths of the transparent parts are arranged irregularly.

Furthermore, with a focus detection device in which focus detection is accomplished by dividing the focus detection area, projection pattern images different from each other are input into the CCD in each focus detection area and the output from each focus detection area differs, causing an error in focus detection.

In addition, the following problems occur in a focus detection device having a focus detection area off the optical axis. In general, driving of the shooting lens in conjunction with focus detection is accomplished several times before an in-focus state is obtained. When the focus detection area is on the optical axis, the projection pattern images input into the CCD differ only slightly before and after driving the lens. However, when the focus detection area is off the optical axis, the projection pattern images input into the CCD differ substantially before and after driving the lens. If a conventional projection pattern film in which the non-transparent part and the transparent part are arranged irregularly is used with the focus detection device having a focus detection area off the optical axis, different projection pattern images are input into the CCD before and after driving the lens. Therefore, outputs from the CCD also differ before and after driving the lens, resulting in a focus detection error.

With a focus detection device having a plurality of focus detection areas, a projection pattern image is input into the CCD with a plurality of focus detection areas. Even if all of these focus detection areas capture the same objects located at the same distance, projection patterns differing from each other are input into each CCD. Therefore, the output from each CCD differs when a conventional projection pattern film with a non-transparent part and transparent part arranged irregularly is used. Hence the objects are not recognized as being at the same distance and a focus detection error results.

Furthermore, in the conventional device, the light transmission rate of the non-transparent parts, which accounts for nearly one half of pattern of the projection pattern material, is zero (not projected on the object at all). The amount of light projected on the object becomes smaller by the amount of light from the projection light source being shielded. The shielding of light causes the projection pattern image to become darker and the accuracy of focus detection to be reduced. Moreover, battery power is not utilized effectively.

In addition, if differences in reflection rate of the objects exist in the part where light rays are not projected on the object due to shielding of non-transparent parts, the probability that focus detection will not be possible increases because a difference in contrast of the objects will not be apparent from the illumination by auxiliary light rays.

SUMMARY OF THE INVENTION

An object of the present invention is to provide a focus detection device having a projection pattern material in which focus detection error does not occur.

A further object of the invention is to improve the accuracy of focus detection by increasing the amount of light to be projected on the object to capture the object without fail.

In order to achieve the first of the objectives described above, a focus detection device is provided that projects auxiliary light rays on an object through a projection optical system including a projection light source, a projection pattern material, and a projection lens. Additionally, the projection optical system composes a pair of object images by using a focus detection optical system to guide a pair of light rays from the object, through a shooting lens and onto a photo-electric converter. The focus state detection device detects the focus adjustment state of the shooting lens based on defocus amount of the pair of object images, and the pattern of a projection pattern material is made of cyclicly arranged non-transparent and transparent parts.

In an embodiment of the invention, the pattern of the projection pattern material is formed with alternating non-transparent and transparent parts. One or more consecutive pairs of transparent and non-transparent parts is designated as a set. In each consecutive pair within a set, the sum of the width of the transparent part and the non-transparent part is equal to a specified constant.

In a further embodiment of the invention, the total width of the non-transparent parts within each set is equal to the total width of the transparent parts within each set.

In an embodiment of the invention, a shooting lens of the focus detection device is a short focus lens and the period of the pattern is set so that the period of the image of the pattern composed on the photo-electric converter becomes larger than a maximum defocus amount.

Alternatively, the shooting lens of the focus detection device may be a long focus lens and the period of the pattern is larger than the range of the image of the pattern composed on the photo-electric converter.

In a further embodiment, the pattern of the projection pattern material comprises a plurality of semi-transparent parts with different light transmission rates. The pattern of the projection pattern material of the focus detection device may also include transparent and/or non-transparent parts.

In an embodiment of the invention, the width of each of the transparent parts, the semi-transparent parts, and the non-transparent parts of the pattern are all equal.

In a further embodiment of the invention, the width of each of the transparent parts, the semi-transparent parts, and the non-transparent parts of the pattern is set randomly.

In one embodiment of the invention, the transparent parts, the semi-transparent parts, and the non-transparent parts of the pattern are arranged cyclicly.

In an alternative embodiment, the semi-transparent parts, transparent parts, and the non-transparent parts of the pattern are arranged randomly.

In an embodiment of the invention, the light transmission rate of the semi-transparent parts is set to be 30–70%.

The projection optical system can either be located on the exterior of the camera or installed inside the camera in other embodiments.

DETAILED DESCRIPTION OF PREFERRED EMBODIMENTS

Embodiments of the focus detection device of the present invention will be described hereafter, with reference to FIGS. 1–9.

Figure 10:
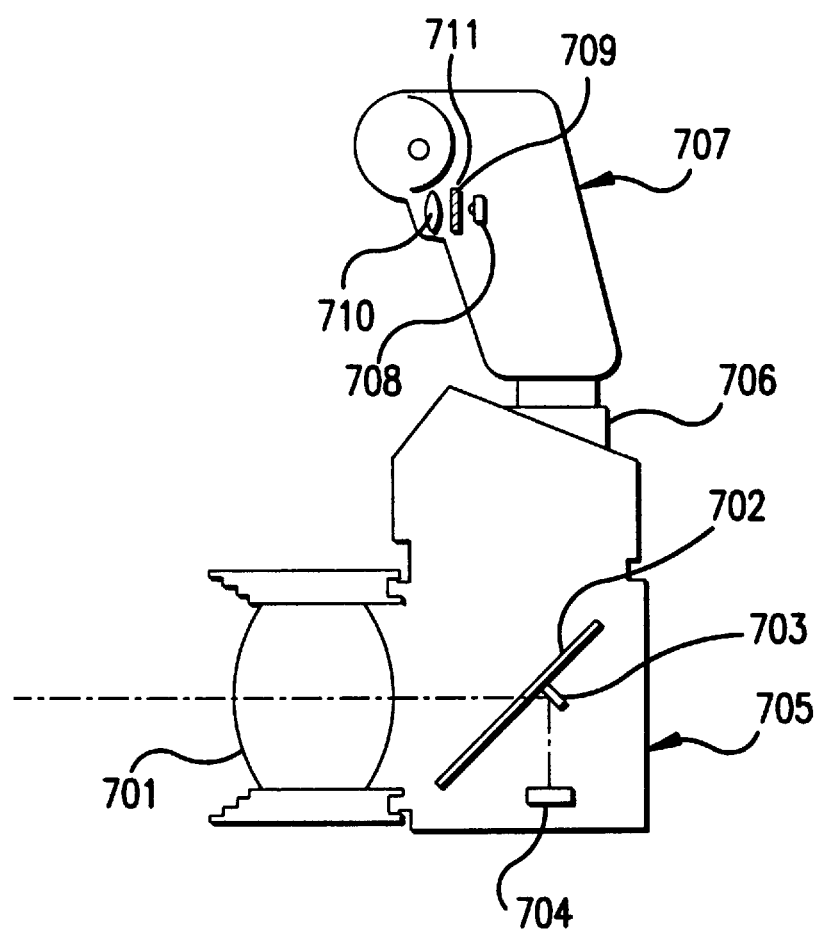
FIG. 10 is a cross section of a camera on which a focus detection device is mounted.
Figure 11:
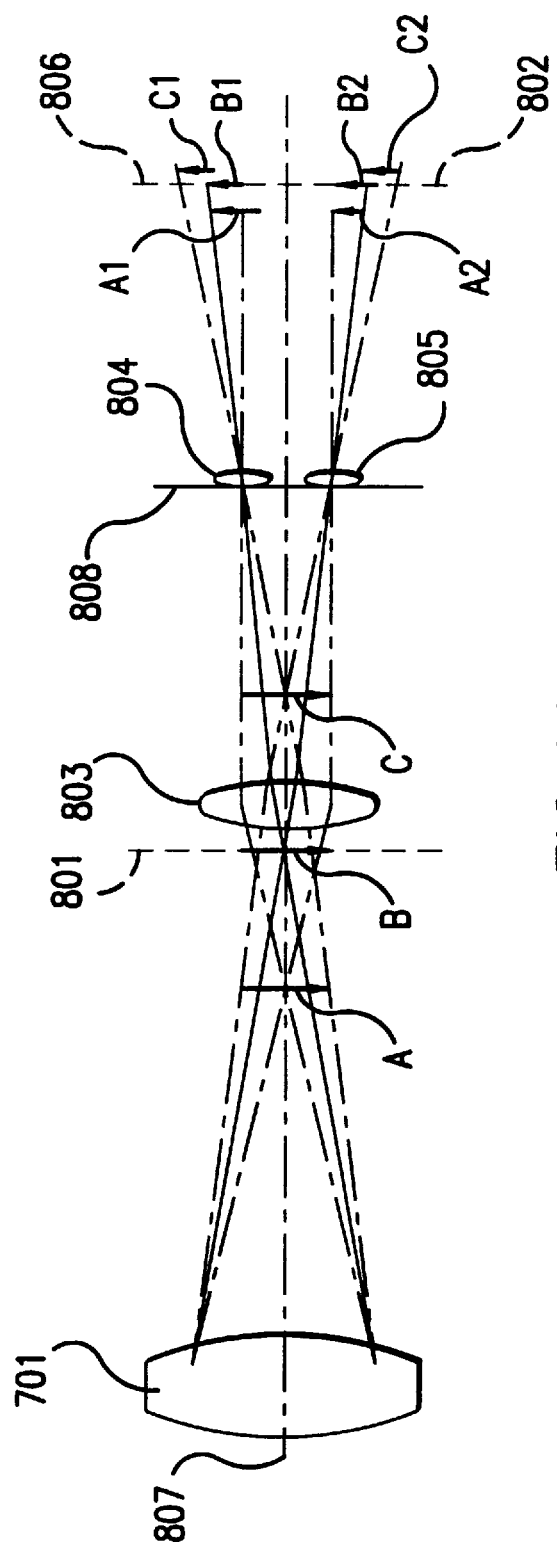
FIG. 11 shows a principle of focus detection based on phase differential method.
Figure 12:
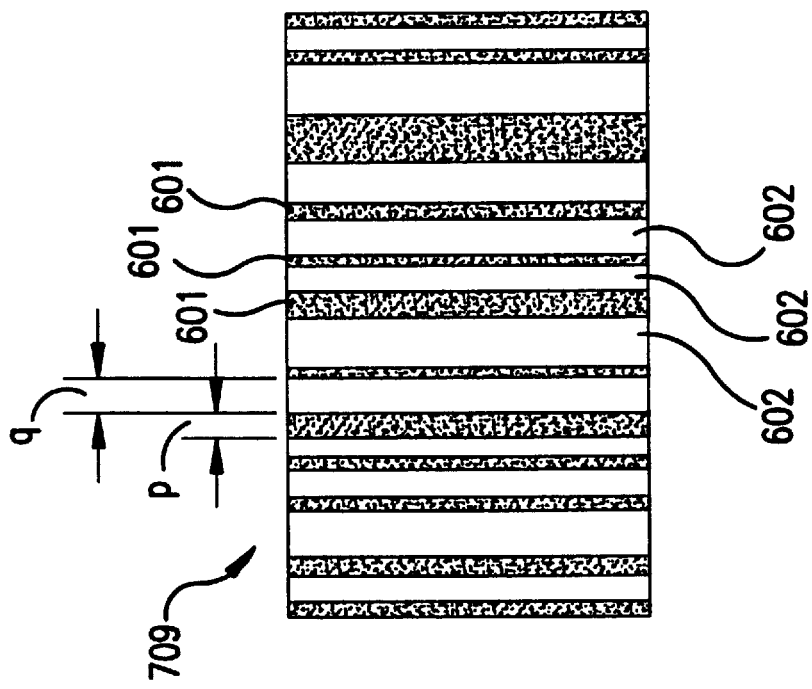
FIG. 12 shows a conventional projection pattern material.

The structure of the camera with the focus detection device is similar to the structure shown in FIGS. 10 and 11, both of which will be used in describing the embodiments of the present invention.

Figure 1:
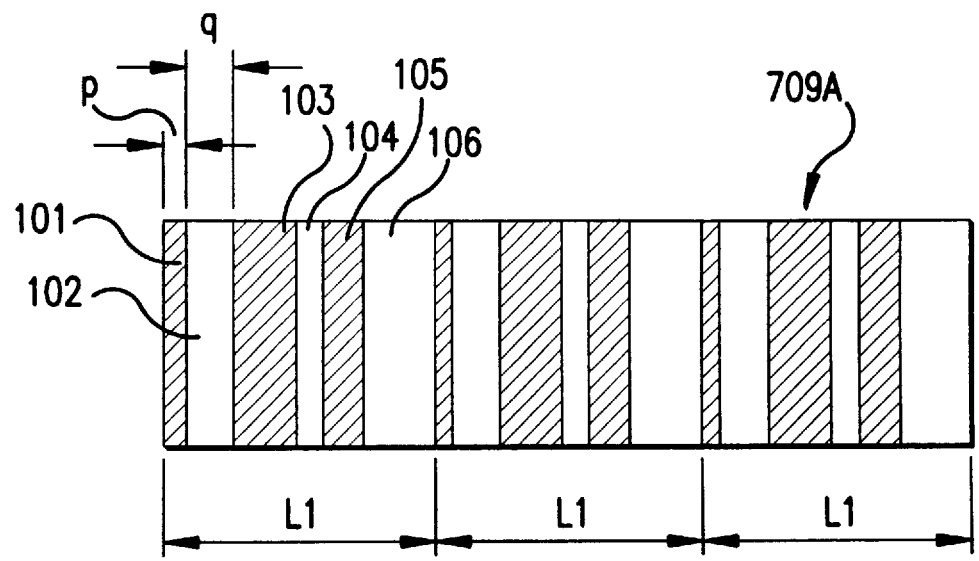
FIG. 1 shows a first embodiment of a pattern of the projection pattern material.

FIG. 1 illustrates a first embodiment of the invention including projection pattern material 709A. In all embodiments of the invention, the projection pattern material can be film, paper, or any other suitable material.

In the pattern of the material 709A, non-transparent parts and transparent parts are arranged cyclicly with specified rules. Non-transparent part 101, transparent part 102, non-transparent part 103, transparent part 104, non-transparent part 105, and transparent part 106 are formed so that the width ratio of each part is respectively 1:2:3:1:2:3. The parts are arranged cyclicly with period L1. Widths of the non-transparent and transparent parts are designated as p and q respectively.

In FIG. 1, reference numerals are assigned to each of the non-transparent parts and the transparent parts in the pattern arrangement equivalent to one period (or one set). Pattern arrangements of other sets are the same and the reference numerals and the explanation thereof will therefore be omitted.

Figure 2:
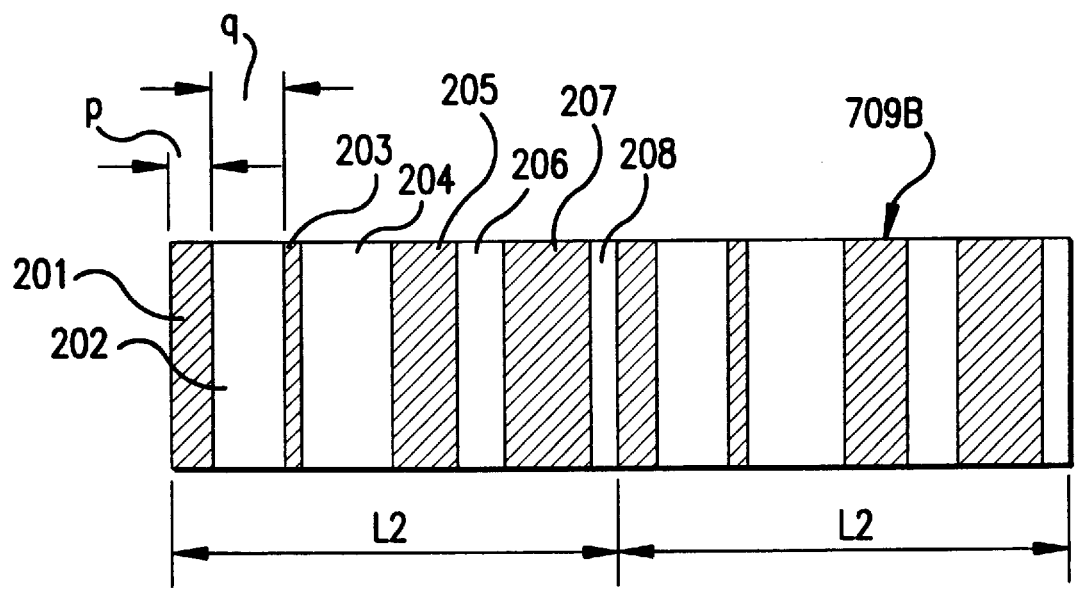
FIG. 2 shows another embodiment of the projection pattern material.

FIG. 2 illustrates a projection pattern material 709B of an alternative embodiment. The pattern of the material 709B sets the width of the non-transparent parts p and the width of the transparent parts q according to the specified rule. The pattern is formed by arranging cyclicly a plurality of non-transparent parts and transparent parts. In the pattern, a group of adjacent non-transparent and transparent parts is designated as one set and the sum (p+q) of the width p of a non-transparent part and a width q of the transparent part (on the right of the non-transparent part in the figure) in each set is equal to a specified constant. The transparent and non-transparent parts are arranged cyclicly with the period L2. The ratios of the widths of non-transparent part 201, transparent part 202, non-transparent part 203, transparent part 204, non-transparent part 205, transparent part 206, non-transparent part 207 and transparent part 208 are selected to be 2:3:1:4:3:2:4:1 respectively.

Again, in FIG. 2, a reference numeral is assigned to each of the non-transparent parts and the transparent parts in one period L2 of the pattern arrangement. Pattern arrangements of other sets are the same, and therefore the explanation and reference numerals thereof will be omitted.

Figure 3:
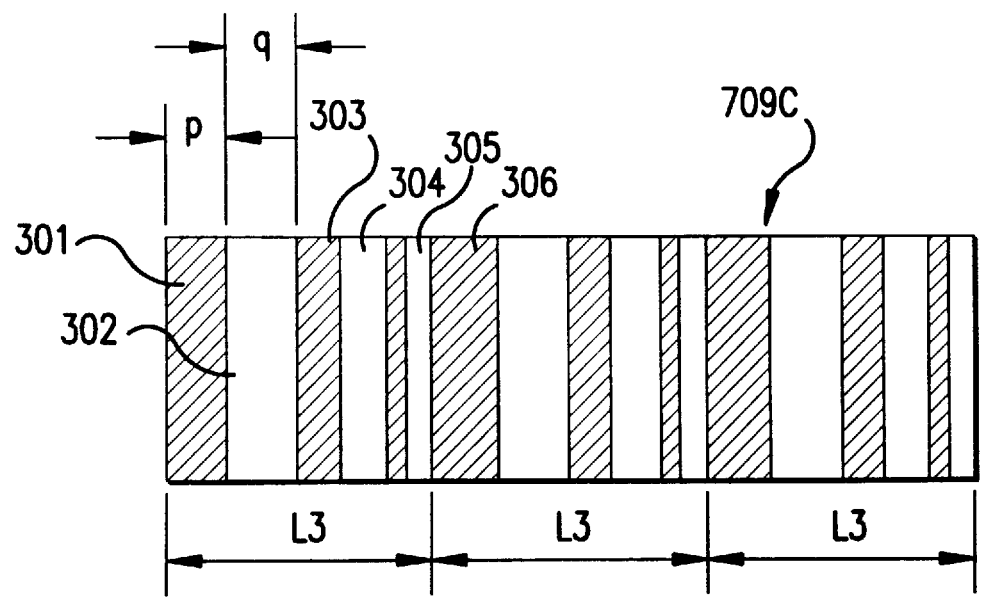
FIG. 3 shows yet another embodiment of the projection pattern material.

FIG. 3 illustrates the projection pattern material 709C of an alternative embodiment. The width of the non-transparent parts p and the width of the transparent parts q are set according to a specified rule. The parts are arranged cyclicly with the period L3 and with the ratio of the width of non-transparent part 301, transparent part 302, non-transparent part 303, transparent part 304, non-transparent part 305, and transparent part 306 selected as 3:3:2:2:1:1.

Again, In FIG. 3, reference numerals are assigned only in one period L3 of the pattern. The other periods have a structure identical to that described.

The patterns of films 709A–709C described above in FIGS. 1–3, are arranged cyclicly with periods L1, L2, and L3, respectively. The output from the photo-electric converter for focus detection is therefore stabilized, occurrence of focus detection error is reduced, and production of projection material becomes easy if a projection pattern material having such cyclic pattern is used.

The projection pattern material is placed near one of the focal points of the projection lens 710 in the projection optical system 711 as illustrated in FIG. 10. The projection lens 710 projects the projection pattern image. Contrast may also exist on the object as a result of illumination from the projection light source 708, which can include light emitting diodes. Focus detection is thereby enabled and facilitated.

The width of one pattern cycle of the projection pattern material is determined as follows.

Figure 4:
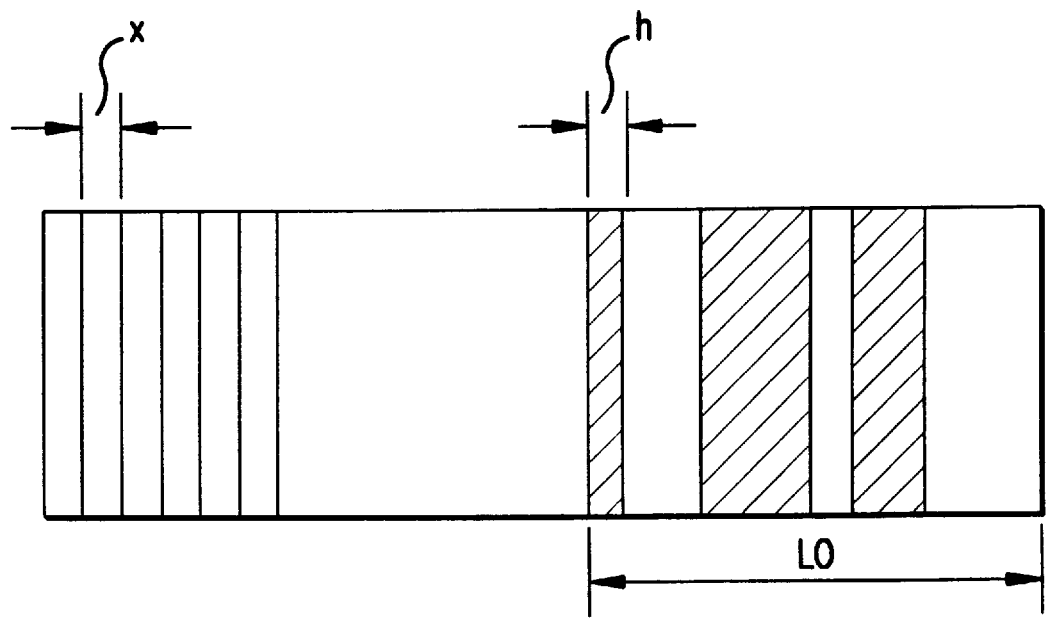
FIG. 4 shows the determination of a width of one period within the pattern of the projection material in the embodiments of FIGS. 1–3.

FIG. 4 illustrates one cycle of a projection pattern image projected on plain object viewed from the focus detection plane.

In the figure, width x is equivalent to one pixel of the photo-electric converter 806 for focus detection on the primary image plane and width h is a width of an unspecified pattern within the projection pattern of one period L0. If the width x of a pixel is larger than the maximum pattern width h, overall output level of the photo-electric converter does not change even if projection pattern image moves within the pixel. Hence, the position of the projection pattern image on the photo-electric converter 806 is not detected correctly.

On the other hand, if the pixel width x is smaller than the maximum pattern width h, such a problem does not occur.

However, only one part within the projection pattern image is used for focus detection and the cyclic characteristic of the focus detection part is therefore lost and contrast is weakened.

Moreover, prevention of a focus detection error through cyclic characteristics must be considered in determining the width of one cycle of the pattern. Hence, the methods to prevent focus detection errors differ depending on the types of interchangeable shooting lenses 701. In other words, of the entire projection image pattern projected on the object, only one part is used for focus detection (the part being input in the CCD). Moreover, when the objects are at the same distance, the part used for focus detection changes greatly depending on the focus detection distance of the shooting lens.

When the shooting lens has a short focus, the focus shift amount from the closest distance to the infinite distance, or maximum defocus amount, is small. Hence, the maximum image shifting amount upon detection of a pair of projection pattern images formed by the pair of re-imaging lenses 804 and 805 of the focus detection device, based on the phase differential method shown in FIG. 11, also is small. Therefore, no focus detection error occurs as long as the maximum image shifting amount is sufficiently smaller than the period of the projection pattern image on the photo-electric converter 806. In other words, it is sufficient to set the period of the pattern so that the period of the projection pattern composed on the photo-electric converter 806 is larger than the maximum image shifting amount when the image shifting amount of the pair of projection pattern images is detected.

Moreover, in the case of a long focus lens, the projection pattern on the photo-electric converter 806 becomes large and no focus detection error occurs if the range of the projection pattern image composed on the photo-electric converter 806 is sufficiently smaller than one period of the pattern of the projection pattern material 709. In other words, it is sufficient to make the period of the pattern larger than the range of the projection pattern image composed on the photo-electric converter 806.

In this manner, the width of one period of the pattern of the projection pattern film 709 is preferably minimized as long as a focus detection error does not occur. Minimization of the period width also controls the reduction of contrast.

As described above, the occurrence of focus detection error is eliminated in the present invention, because the projection pattern material is a pattern in which a plurality of non-transparent parts and transparent parts are arranged cyclicly. Hence, the bright parts corresponding to the transparent parts and the dark parts corresponding to the non-transparent parts of the projection pattern film on the photo-electric converter are arranged cyclicly, resulting in stable output from the photo-electric conversion elements.

Also, because of the cyclic nature of the pattern material, its production is simplified.

Moreover, in performing focus detection by dividing the focus detection area, occurrence of focus detection error is eliminated by using projection pattern material with a cyclic pattern, because similar projection patterns are input into the CCD in each divided area.

When the focus detection area is provided off the optical axis, the occurrence of focus detection error is eliminated by using projection pattern material with a cyclic pattern, because projection pattern images being input into the CCD before and after driving of the lens become similar due to the cyclic nature of the pattern. Hence, the outputs from the CCD before and after driving of the lens also become similar, even though the parts in the entire projection pattern image projected on the object to be input in the CCD are different.

In addition, even when a plurality of focus detection areas is used, the occurrence of focus detection error is eliminated if the projection pattern film with a cyclic pattern is used because similar pattern images are input in the plurality of CCD detection areas corresponding to each of the plurality of the focus detection areas. Hence, the plurality of outputs from the CCD become similar.

Occurrence of focus detection error is eliminated relative to any type of lens because the period of the pattern is set in such manner that the period of the pattern image composed on the photo-electric converter is larger than the maximum image shifting amount upon detection of the image defocus amount of the pair of object images when the shooting lens has a short focus and larger than the range of the pattern image composed on the photo-electric converter when the shooting lens has long focus.

In order to achieve the objective of improving the accuracy of focus detection and capturing the image without fail, the projection pattern material can include semi-transparent parts.

Figure 5:
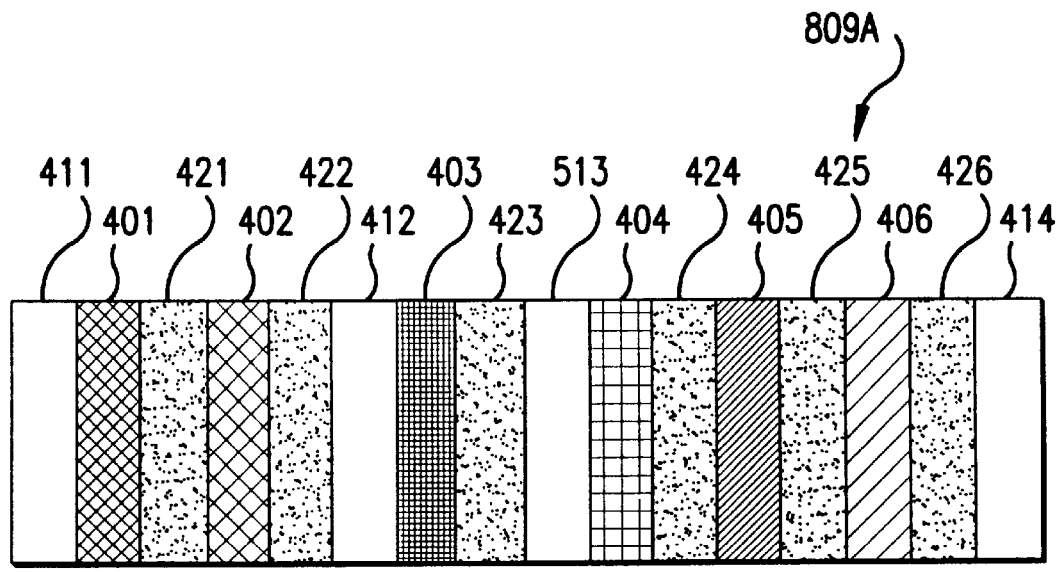
FIG. 5 shows a further embodiment of the projection pattern material.

FIG. 5 illustrates a projection pattern film 809A in an embodiment of the invention that includes semi-transparent parts. The pattern comprises a plurality of semi-transparent parts 401–406 with different light transmission rates, a plurality of transparent parts 411–414, and a plurality of non-transparent parts 421–426. The width of each semi-transparent part, each transparent part, and each non-transparent part is the same. In this embodiment, the three types of parts are arranged randomly and the light transmission rate of the semi-transparent parts 401–406 is set at 30–70%.

Figure 6:
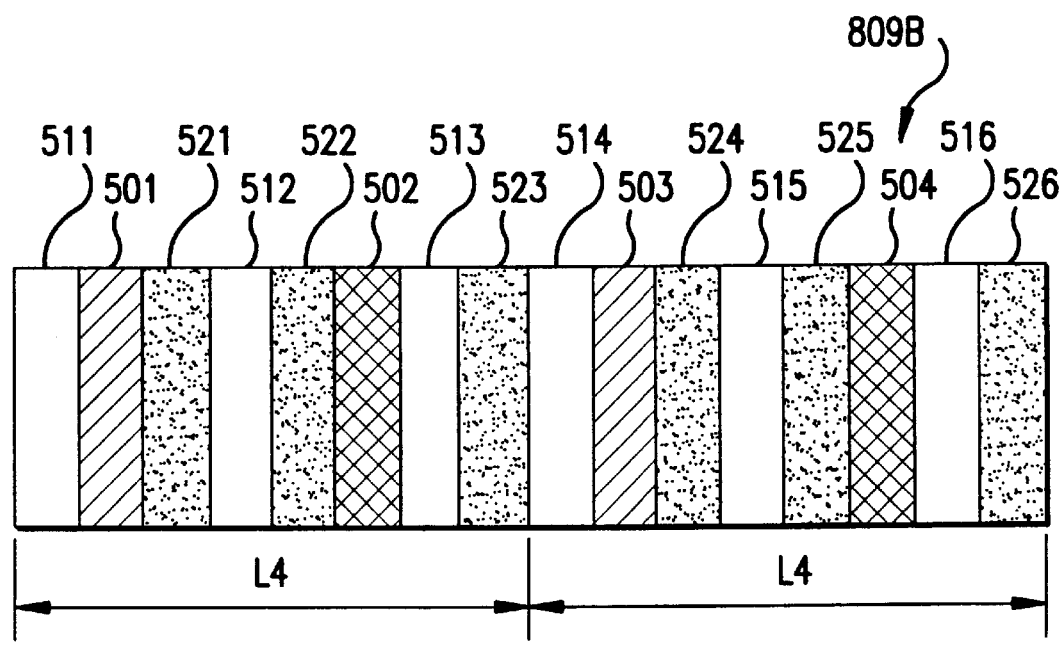
FIG. 6 shows another embodiment of the projection pattern material.

FIG. 6 illustrates the projection pattern film of an alternative embodiment. The pattern comprises a plurality of semi-transparent parts 501–504 with different light transmission rates, a plurality of transparent parts 511–516, and a plurality of non-transparent parts 521–526. The width of each semi-transparent part, each transparent part, and each non-transparent part is the same. Furthermore, the semi-transparent parts, transparent parts, and non-transparent parts are arranged cyclicly with a period L4. Here, the light transmission rate of the semi-transparent parts 501–504 is set at 30–70%.

Figure 7:
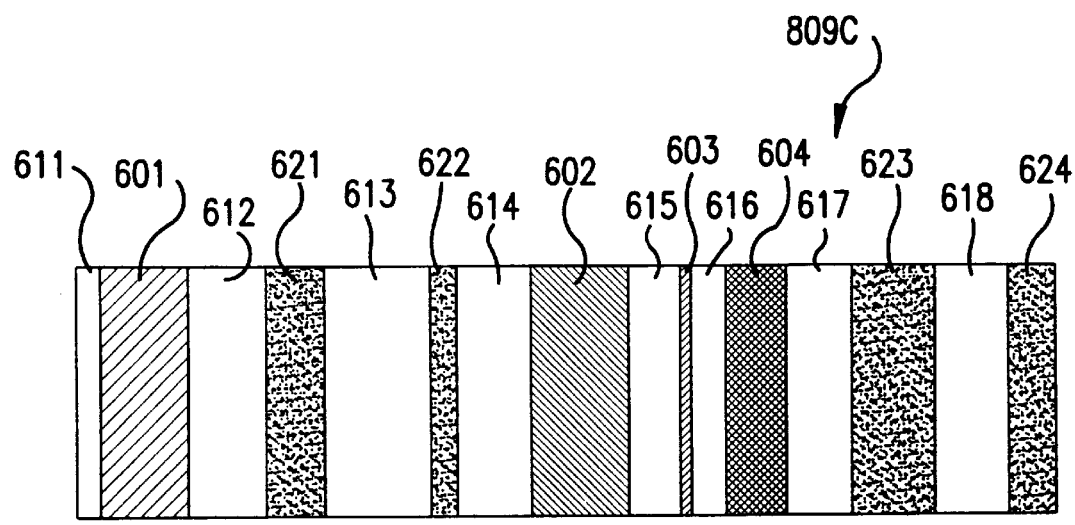
FIG. 7 shows yet another embodiment of the projection pattern material.

FIG. 7 illustrates a projection pattern material 809C of another embodiment of the invention. The pattern comprises a plurality of semi-transparent parts 601–604 with different light transmission rates, a plurality of transparent parts 611–618, and a plurality of non-transparent parts 621–624. The width of each semi-transparent part, each transparent part, and each non-transparent part is set randomly. Semi-transparent parts or non-transparent parts are positioned to the right of transparent parts. Here, the light transmission rate of the semi-transparent parts 601–604 is set at 30–70%.

Figure 8:
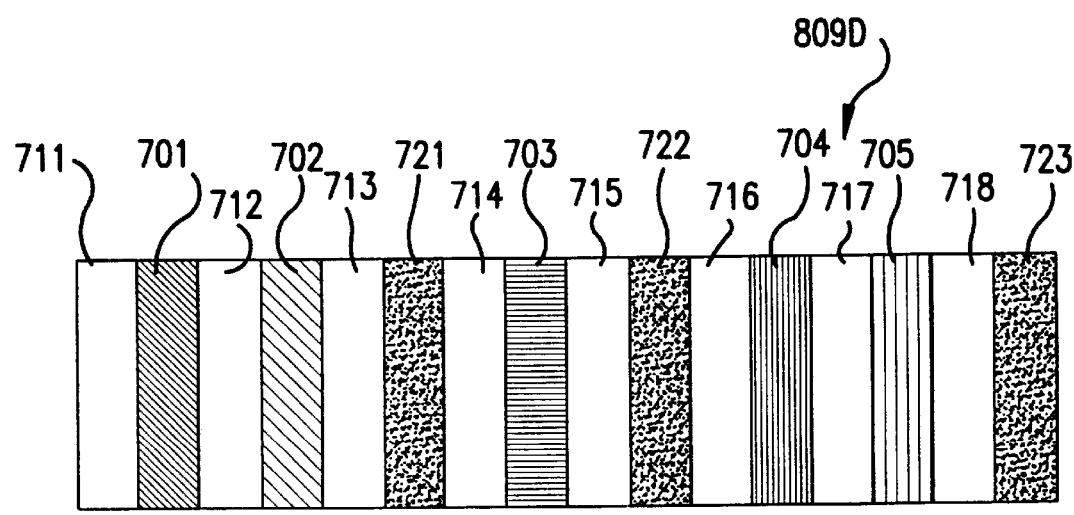
FIG. 8 shows still another embodiment of the projection pattern material.

FIG. 8 illustrates a projection pattern material 809D of an alternative embodiment. The pattern comprises a plurality of semi-transparent parts 701–705 with different light transmission rates, a plurality of transparent parts 711–718, and a plurality of non-transparent parts 721–723. The width of each semi-transparent part, each transparent part, and each non-transparent part is the same. Semi-transparent parts or non-transparent parts are arranged to the right of transparent parts. Here, the light transmission rate of the semi-transparent parts 701–705 is set to 30–70%.

Figure 9:
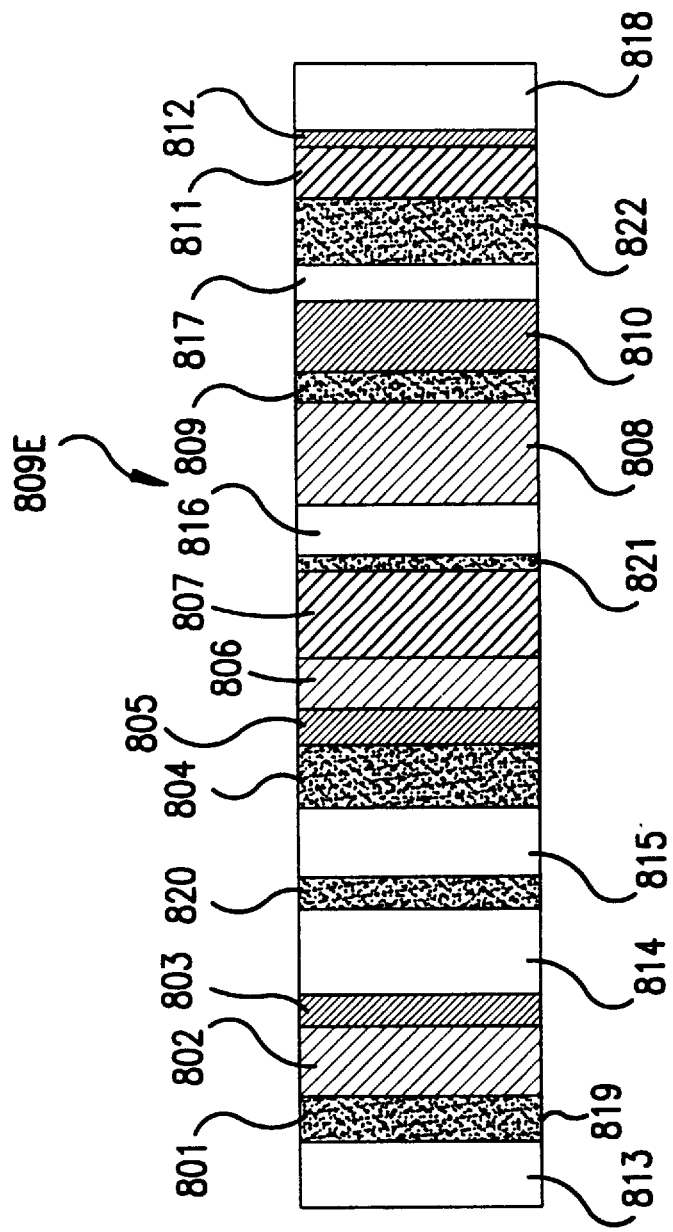
FIG. 9 shows another embodiment of the projection pattern material.

FIG. 9 illustrates a projection pattern material 809E of an alternative embodiment. The pattern comprises a plurality of semi-transparent parts 801–812, a plurality of transparent parts 813–818, and a plurality of non-transparent parts 819–822. The widths of each of the parts are set randomly and the parts are arranged randomly. The plurality of semi-transparent parts can have different transmission rates.

In the patterns of each embodiment described above, the sum of the widths of the semi-transparent parts is less than half the width of the entire material. The sum of the widths of non-transparent parts and transparent parts is greater than half the width of the entire material. Therefore, the amount of light transmitted by these patterns is larger than in conventional patterns which no semi-transparent parts are included.

The inclusion of semi-transparent parts enables brighter illumination of the object and execution of focus detection than with the conventional method and improves the accuracy of the focus detection. Moreover, the probability of a reflection rate difference existing in the part where light rays are shielded by the non-transparent parts decreases. This enables reliable capturing of the object and reduction of the probability that focus detection will become impossible.

Moreover, as the number of light rays transmitting the pattern increases, it becomes possible to project the pattern image onto an object further away, enabling focus detection for the object further away.

In addition, even if the widths of semi-transparent parts, transparent parts, and non-transparent parts are equal, the transmission rates of the entire projection pattern material are set randomly. Therefore, it is impossible to have more than one location in which a pair of projection pattern images coincides on the photo-electric converter, thereby eliminating the occurrence of focus detection errors.

The projection pattern material is placed near one of the focal points of the projection lens 710 in the projection optical system 711 as shown in FIG. 10. The projection lens 710 projects the projection pattern image on the object and creates contrast on the object. Thereby, focus detection is enabled.

In this instance, the pattern of projection pattern material is not limited to the embodiments described above. For example, the width of the plurality of semi-transparent parts with different light transmission rates may be set randomly and the light transmission rate of the semi-transparent parts can be changed.

Moreover, in all of the embodiments of FIGS. 1–9, the projection optical system 711 is provided inside the flash device 707, but the projection optical system 711 may be installed outside and independent of the flash device 707. Furthermore, the projection optical system 711 can be installed not only on the accessory shoe 706, which is provided on the top surface of the camera, but also on suitable hardware provided on the camera 705.

Furthermore, the light transmission rate of the semi-transparent parts in the pattern of the embodiments of FIGS. 5–9 is set at 30–70%. However, the light transmission rate is not limited by the above embodiments and may be set such that a part that approaches transparency may be the transparent part and a part which approaches non-transparency may be the non-transparent part. A part having a light transmission rate between these extremes may be selected as the semi-transparent part.

In addition, with the embodiments shown in FIGS. 5–9 above, the patterns are formed by semi-transparent parts, transparent parts, and non-transparent parts. However, the pattern may be formed only by the plurality of semi-transparent parts or may be formed by adding transparent parts and/or non-transparent parts to the plurality of the semi-transparent parts.

As described above, according to the present invention, the pattern of the projection pattern material is made to comprise a plurality of semi-transparent parts with different light transmission rates. Hence, the sum of the widths of the non-transparent parts is smaller than half the width of the entire projection pattern material and the sum of the widths of the semi-transparent parts and the transparent parts is greater than one half the width of the entire projection pattern material. Thus, the amount of light transmitted with such a pattern is greater than the amount of light in conventional patterns that do not include semi-transparent parts. Hence, it becomes possible to illuminate the object more brightly and to improve the accuracy of focus detection because focus detection is executed based on the projection pattern images that are brighter than with conventional methods.

Moreover, a probability of a reflection rate difference of the object existing in the part where light rays are not projected on the object, where shielded by the non-transparent parts, becomes small, enabling sure capturing of the object and reducing the probability of the focus detection becoming impossible.

Moreover, as the amount of light transmitted by the pattern increases, it becomes possible to project the pattern image onto an object further away, enabling focus detection for the object further away.

In addition, even if the widths of semi-transparent parts, transparent parts, and non-transparent parts are all equal, the transmission rates of the entire projection pattern material are set randomly. Therefore, it is impossible to have more than one location in which a pair of projection pattern images coincide on the photo-electric converter, eliminating the occurrence of focus detection error.

In this instance, the manufacturing process is simplified if the widths of the transparent parts, semi-transparent parts, and the non transparent parts are equal.

In summary, in the present invention, focus detection error is eliminated through the use of a specified projection pattern material. The material may include either a plurality of cyclicly arranged transparent and non-transparent parts or a specified arrangement of semi-transparent parts. For the reasons specified above, both of these configurations are conducive to eliminating focus detection error.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A focus detection device, comprising:
    a projection optical system that projects auxiliary light rays on an object, the project optical system comprising,
        a projection light source,
        a projection pattern material comprising a plurality of cyclically arranged non-transparent parts and transparent parts, widths of the non-transparent parts and widths of the transparent parts related by a specified rule, and
        a projection lens; and
    a focus detection optical system that composes a pair of object images by guiding a pair of light rays from the object passing through a shooting lens, the focus detection optical system comprising a detector that detects a focus adjustment state of the shooting lens based on a defocus amount of the pair of object images, the projection pattern material comprising a plurality of sets, wherein the specified rule is such that a sum of the widths of the non-transparent parts in each of said sets is equal to a sum of the widths of the transparent parts in each of said sets.

2. The focus detection device of claim 1, wherein the projection pattern material comprises adjacent pairs of one of said non-transparent parts and one of said transparent parts, wherein a plurality of adjacent pairs is designated as a set.

3. The focus detection device of claim 1, wherein the projection pattern material comprises a film material.

4. The focus detection device of claim 1, wherein the projection pattern material comprises a paper material.

5. The focus detection device of claim 1, wherein a period of the pattern is selected so that a period of the image of the pattern composed on the photo-electric converter is larger than a maximum image shifting amount.

6. The focus detection device of claim 1, wherein a period of the pattern is selected to be larger than a range of an image of a pattern composed on the photo-electric converter.

7. The focus detection device of claim 1, wherein the projection optical system is attached on an exterior of a camera.

8. The focus detection device of claim 1, wherein the projection optical system is installed inside a camera.

9. A focus detection device, comprising:
    a projection optical system that projects auxiliary light rays on an object, the projection optical system comprising,
        a projection light source,
        a projection pattern material comprising at least one semi-transparent part, and
        a projection lens; and
    a focus detection optical system that composes a pair of object images by guiding a pair of light rays from the object passing through a shooting lens, the focus detection optical system comprising a detector that detects a focus adjustment state of the shooting lens based on a defocus amount of the pair of object images.

10. The focus detection device of claim 9, wherein the at least one semi-transparent part is a plurality of semi-transparent parts.

11. The focus detection device of claim 10, wherein each semi-transparent part of the plurality of semi-transparent parts has a different light transmission rate.

12. The focus detection device of claim 10, wherein the pattern of the projection pattern material comprises a plurality of transparent parts.

13. The focus detection device of claim 12, wherein the projection pattern material comprises a plurality of non-transparent parts.

14. The focus detection device of claim 13, wherein widths of each of the of the transparent parts, the semi-transparent parts, and the non-transparent parts of the pattern are equal.

15. The focus detection device of claim 13, wherein a total width of semi-transparent parts and transparent parts is greater than half an entire width of the projection pattern material.

16. The focus detection device of claim 13, wherein the widths of the transparent parts, the semi-transparent parts, and the non-transparent parts are set randomly.

17. The focus detection device of claim 13, wherein the transparent parts, the semi-transparent parts, and the non-transparent parts are arranged cyclicly.

18. The focus detection device of claim 13, wherein the transparent parts, the semi-transparent parts, and the non-transparent parts of the pattern are arranged randomly.

19. The focus detection device of claim 9, wherein the projection pattern material comprises a film material.

20. The focus detection device of claim 9, wherein the projection pattern material comprises a paper material.

21. The focus detection device of claim 9, wherein the light transmission rate of the at least one semi-transparent part is 30–70%.

22. The focus detection device of claim 9, wherein the projection optical system is attached on an exterior of a camera.

23. The focus detection device of claim 9, wherein the projection optical system is installed inside a camera.

24. A focus detection method for eliminating error in focus detection, the method comprising:

projecting auxiliary light rays onto an object through a projection pattern material comprising a plurality of cyclically arranged transparent and non-transparent parts, widths of the non-transparent parts and widths of the transparent parts related by a specified rule;

composing a pair of object images with a focus detection optical system by guiding a pair of light rays from the object passing through a shooting lens; and detecting a focus adjustment state of the shooting lens based on a defocus amount of a pair of object images, the projection pattern material comprising a plurality of sets, wherein the specified rule is such that a sum of the widths of the non-transparent parts in each of said sets is equal to a sum of the widths of the transparent parts in each of said sets.

25. The focus detection method of claim 24, wherein the step of passing the light rays through the projection pattern material comprises directing the light rays to the cyclically arranged transparent and non-transparent parts, wherein the transparent and non-transparent parts are arranged as adjacent pairs of one of said non-transparent parts and one of said transparent parts, wherein a plurality of adjacent pairs is designated as a set.

26. The focus detection method of claim 25, wherein the specified rule is such that within each of said pairs within a set, a sum of a width of the one transparent part and a width of the one non-transparent part is equal to a specified constant.

27. A focus detection method for eliminating error in focus detection, the method comprising:

projecting auxiliary light rays onto an object through a projection pattern material comprising at least one semi-transparent part;

composing a pair of object images with a focus detection optical system by guiding a pair of light rays from the object passing through a shooting lens; and detecting a focus adjustment state of the shooting lens based on a defocus amount of a pair of object images.

28. The focus detection method of claim 27, wherein the step of passing the light rays through the projection pattern material comprises passing the light rays through a plurality of semi-transparent parts.

29. The focus detection method of claim 28, wherein the step of passing the light rays through the projection pattern material comprises passing the light rays through a plurality of semi-transparent parts having different light transmission rates.

30. The focus detection method of claim 28, wherein the step of passing the light rays through the projection pattern material further comprises passing the light rays through a plurality of transparent parts.

31. The focus detection method of claim 30, wherein the step of passing the light rays through the projection pattern material further comprises directing the light rays to a plurality of non-transparent parts.

32. The focus detection method of claim 31, wherein widths of each of the of the transparent parts, the semi-transparent parts, and the non-transparent parts of the pattern are equal.

33. The focus detection method of claim 31, wherein a total width of semi-transparent parts and transparent parts is greater than half an entire width of the projection pattern material.

34. The focus detection method of claim 31, wherein the transparent parts, the semi-transparent parts, and the non-transparent parts are arranged randomly.

35. The focus detection method of claim 31, wherein the transparent parts, the semi-transparent parts, and the non-transparent parts are arranged cyclically.

* * * * *

UNITED STATES PATENT AND TRADEMARK OFFICE
CERTIFICATE OF CORRECTION

PATENT NO.   : 5,771,412
DATED        : June 23, 1998
INVENTOR(S)  : Hirokazu KOBAYASHI et al.

It is certified that error appears in the above-identified patent and that said Letters Patent is hereby corrected as shown below:

Claim 14, line 2, delete "of the" (first occurrence).

Claim 17, line 3, change "cyclicly" to --cyclically--.

Claim 32, line 2, delete "of the" (first occurrence).

Signed and Sealed this

Twenty-ninth Day of December, 1998

*Attest:*

BRUCE LEHMAN

*Attesting Officer*          *Commissioner of Patents and Trademarks*